(No Model.)
T. N. CROOK.
SAFETY AXLE.
No. 602,308. Patented Apr. 12, 1898.
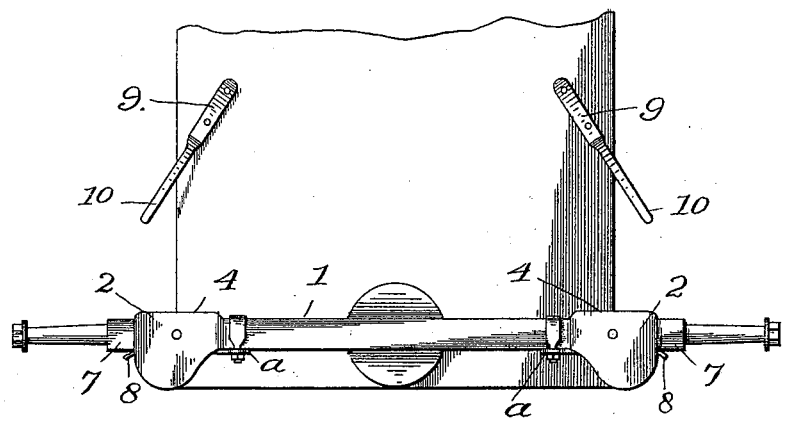
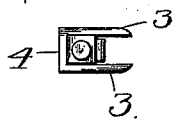
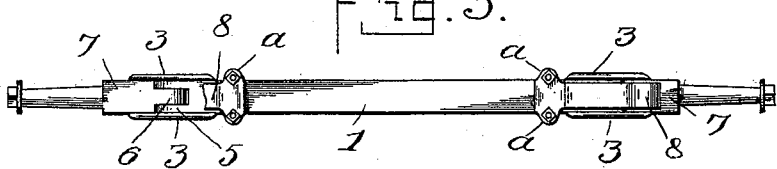
Witnesses
Harry W. Hahn
Victor J. Evans
Inventor
Thomas N. Crook.
by John Wedderburn
Attorney

UNITED STATES PATENT OFFICE.

THOMAS NATHON CROOK, OF YORK, PENNSYLVANIA.

SAFETY-AXLE.

SPECIFICATION forming part of Letters Patent No. 602,308, dated April 12, 1898.

Application filed July 13, 1897. Serial No. 644,435. (No model.)

*To all whom it may concern:*

Be it known that I, THOMAS NATHON CROOK, of York, in the county of York and State of Pennsylvania, have invented certain new and useful Improvements in Safety-Axles; and I do hereby declare the following to be a full, clear, and exact description of the invention, such as will enable others skilled in the art to which it appertains to make and use the same.

This invention relates to improvements in vehicles, and more especially to providing the forward axle of a vehicle with pivoted sections or spindles upon which the wheels are mounted in order to prevent said wheels coming in contact with the body when a short turn is made, contemplating a construction by which the pivoted sections or spindles are normally held in proper line and with sufficient force to permit the vehicle to be backed, while yielding when moved into engagement with a projection on the body of the vehicle.

To the above ends the invention consists of a wagon-axle, the same comprising a main section enlarged at its ends providing sockets open at one side, spindle-sections pivoted within the sockets and brought on a line with the main section in engagement with the closed side of the sockets, and a flat spring for bringing the sections in line, in combination with projections extending from the body of the vehicle, as described in detail in the following specification, and specifically set forth in the claims.

In the accompanying drawings, forming a part of this specification, Figure 1 is a bottom plan view of an axle constructed in accordance with my invention, also showing a portion of the body of the wagon. Fig. 2 is a side elevation. Fig. 3 is a front elevation with one of the springs broken away. Fig. 4 is a detail sectional view of one of the springs. Fig. 5 is a detail view of one of the spindle-sections.

Referring more particularly to the drawings, 1 designates the main section of the axle, which is connected centrally to the running-gear of the vehicle in the usual manner and is provided at each end with a socket 2, presenting upper and lower plates 3 3, forming the top and bottom of the said socket and connected at their rear ends by a vertical wall 4, which forms the closed side of the socket.

The socket is larger at its outer end, presenting a narrow extension 5, into which fits a corresponding extension 6 at the inner end of the spindle 7 of the axle, the end of the main axle, and also the inner end of the spindle, being rounded so as not to interfere with the proper movement of one upon the other. The plates which form the top and bottom of the socket are extended at their side opposite the vertical wall to form an increased bearing for the spindle-section when the same is turned upon its pivot, and when said spindle-section is swung to a position on a line with the main axle it bears against the vertical wall 4. In order to hold the spindle-sections on a line with the main section of the axle, plate-springs 8 are secured to the main section and bear at their free ends against the spindle-sections with sufficient force to hold them on a proper line and permit the vehicle to be backed, while yielding when sufficient pressure is brought back against the same. These plate-springs are provided at their rear ends with vertical flanges *a a*, which provide for connecting the springs to the axle by the ordinary thill-clips, said clips being engaged at their edges by the aforesaid flanges.

In connection with an axle constructed as hereinbefore described I provide the body of the vehicle with a cross-bar 9, attached to the under side of the box and terminating at its ends in projections 10, arranged or positioned with respect to the said axle as to engage the spindle-sections and turn the same upon their pivots when the axle is turned.

By providing a vehicle with my improved axle a much shorter turn can be made, and the wheel, which is usually turned against the body of the vehicle, is moved so as not to contact therewith.

Having thus described my invention, what I claim as new, and desire to secure by Letters Patent, is—

1. An axle for vehicles, comprising an intermediate section, end sections pivoted to the intermediate section and forming the spindles, and springs secured to the intermediate section to bear against the end sections; together with projections on the body of the vehicle, substantially as shown and for the purpose set forth.

2. In an axle for vehicles, the combination with an intermediate section formed at its ends into sockets open at one side, spindle-sections pivoted within the sockets to swing laterally with respect to the main section, plate-springs attached to the main section and bearing at their free ends against the spindle-sections to hold them normally on a line with said main section, and projections on the body of the vehicle positioned to engage the spindle-sections, substantially as shown and for the purpose set forth.

3. In an axle for vehicles, the combination with a central or main section, sockets formed at the ends thereof, said sockets being open at one side and the top and bottom plates extended vertically, spindle-sections pivoted within the sockets to have a lateral movement with respect to the main section of the axle, plate-springs secured to the axle by the thill-clips and bearing at their free ends upon the spindle-sections; together with a cross-bar attached to the under side of the body of the vehicle and presenting projections arranged to engage the pivoted spindle-sections, substantially as shown and for the purpose set forth.

In testimony whereof I have signed this specification in the presence of two subscribing witnesses.

THOMAS NATHON CROOK.

Witnesses:
JAS. L. KOPP,
JAMES CRIMINS.